Aug. 14, 1934.  C. J. MILLER  1,970,332
AUTOMOBILE SIGNAL
Filed Aug. 24, 1932  2 Sheets-Sheet 1
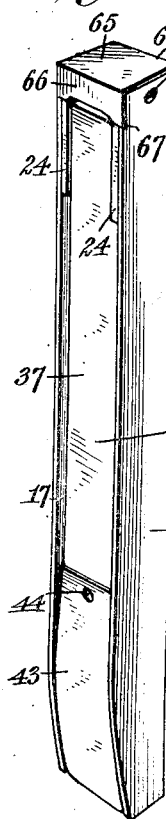
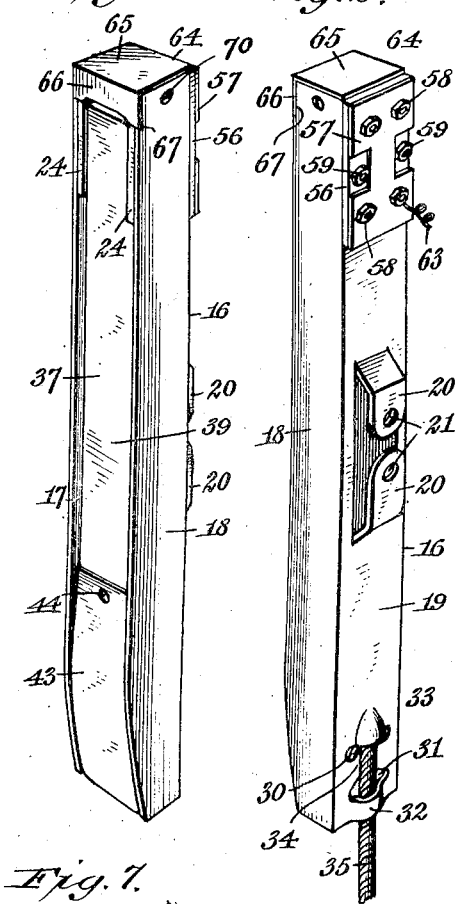
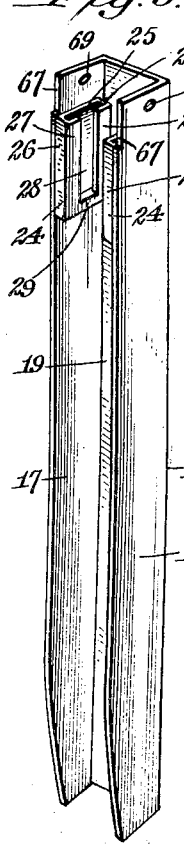
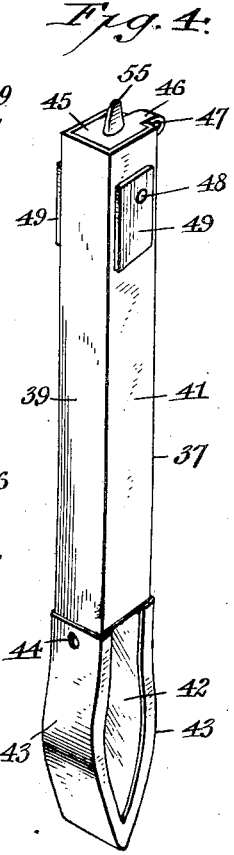
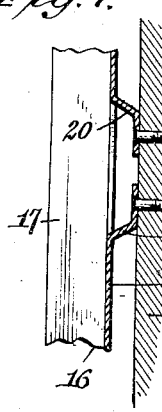
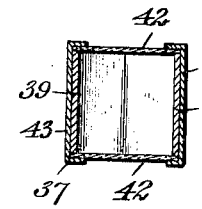
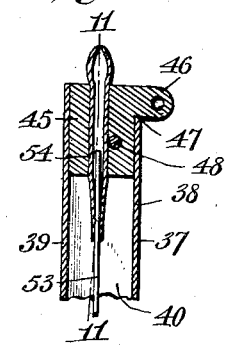
Charles J. Miller, Inventor.
By Emil Keinhart
Attorney.

Aug. 14, 1934.  C. J. MILLER  1,970,332
AUTOMOBILE SIGNAL
Filed Aug. 24, 1932  2 Sheets-Sheet 2
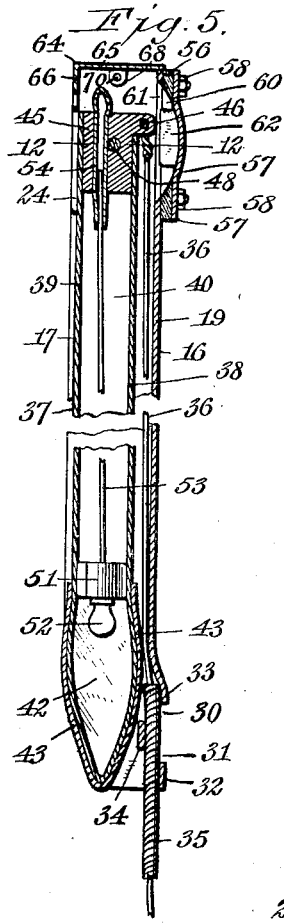
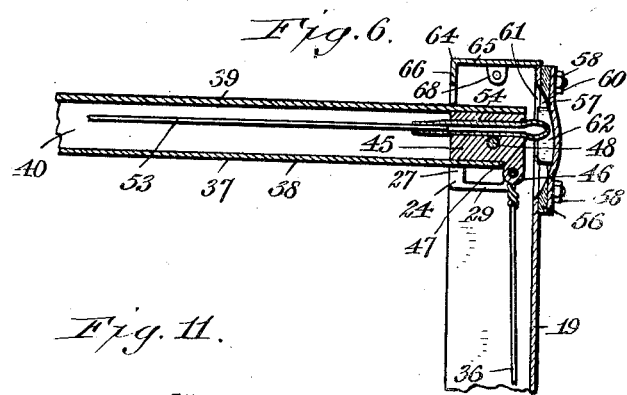
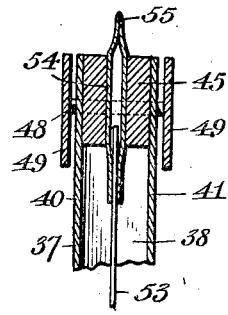
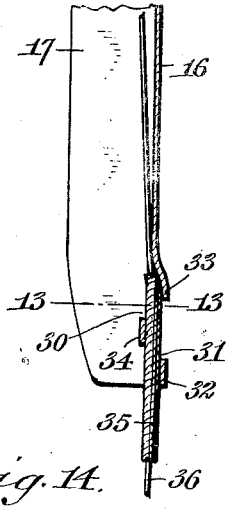
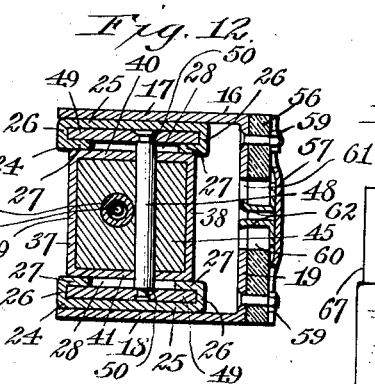
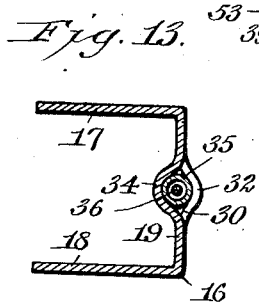
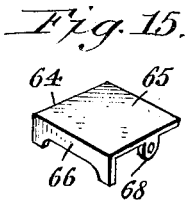
Charles J. Miller, Inventor.
By Emil Keuhart
Attorney.

Patented Aug. 14, 1934

1,970,332

UNITED STATES PATENT OFFICE 1,970,332

AUTOMOBILE SIGNAL

Charles J. Miller, Buffalo, N. Y.

Application August 24, 1932, Serial No. 630,258

12 Claims. (Cl. 116—52)

This invention relates to automobile signals of the type provided to indicate that a change in the course of direction of travel of the automobile is to be made, it having for one of its objects to provide an improved signal, which can be operated by the driver of the automobile to notify vehicles approaching, or following, that a stop or turn is to be made.

While the device may be employed for indicating that a stop is to be made, vehicles of the kind to which signals of this general type are applied are invariably provided with rear stop lights as installed equipment, and therefore I have designed my improved signal as one especially adapted to indicate that a change in the direct course of the vehicle is to be made.

Another object of my invention is the provision of an improved comparatively small device, which includes a casing and a signal arm pivotally secured within the casing and adapted to be retained therein while traveling in a straight course, the casing being long and slender so that it occupies comparatively little space and the entire device being adaptable for use in connection with automobiles or other vehicles of various kinds, and to be conveniently operated by the driver from his seat.

Another object of my invention is the provision of a simple and inexpensive signal having comparatively few parts and capable of being easily assembled, or disassembled so that repairs can be readily made thereto, particularly such as necessitate repairs to the circuit wires and lamp.

Broadly considered, the device includes an elongated casing adapted to be vertically secured to the side of an automobile, and a pivoted arm which can be swung into and out of the casing by manipulation of suitable operating mechanism extending into the automobile within convenient reach of the operator; the device further including an electric lamp or bulb so wired that when the arm is swung into signaling position the lamp or bulb will be lighted, suitable contacts on the arm and casing being brought into engagement when the arm is swung out of the casing.

With the above objects and others in view to appear hereinafter, my invention consists in the novel features of construction and in the arrangement and combination of parts to be hereinafter described and more particularly pointed out in the subjoined claims.

In the drawings:

Fig. 1 is a perspective view of the complete device, the view being taken to illustrate one of the sides of the device and the front and top thereof.

Fig. 2 is a perspective view of the complete device, the view being taken to illustrate one of the sides and the rear and top thereof.

Fig. 3 is a perspective view of the casing with the cap or cover and the signal arm removed therefrom.

Fig. 4 is a perspective view of the signal arm.

Fig. 5 is a central longitudinal section through the complete device, the same being shown with the signal arm confined within the casing and the contact of the signal arm disengaged from the contact of the casing, the casing and signal arm being broken to indicate additional length.

Fig. 6 is a similar view showing the outer end of the signal arm broken away and the arm swung into signal position with the contact thereof in engagement with the contact of the casing.

Fig. 7 is a longiudinal section through the casing along the region of the securing lugs formed thereon.

Fig. 8 is a front elevation of the upper or inner end of the signal arm.

Fig. 9 is a cross section taken through the light chamber at the outer end of the signal arm.

Fig. 10 is a longitudinal section through the upper or inner end of the signal arm taken on line 10—10, Fig. 8.

Fig. 11 is a longitudinal section taken on line 11—11, Fig. 10.

Fig. 12 is an enlarged cross section taken on line 12—12, Fig. 5.

Fig. 13 is an enlarged cross section taken on line 13—13, Fig. 6.

Fig. 14 is an enlarged longitudinal section through the upper end of the casing.

Fig. 15 is a detached perspective view of the cap or cover employed at the upper or inner end of the casing.

Referring more particularly to the drawings, the reference numeral 16 designates a casing, which is channel shaped or of substantially U-formation in cross section so as to provide two side walls 17, 18, an inner wall 19 and an outer open side, the sides 17 and 18 being narrowed at their lower ends. Both the bottom and top of this casing are open, but the open upper end is adapted to be closed, as will appear hereinafter.

Securing lugs 20 are stamped out of the inner wall of the casing, the metal being directed outwardly from said inner wall obliquely thereto and thence parallel to said wall to form lugs in opposing relation, as clearly shown in Fig. 2.

Said lugs have screw holes 21 formed therein through which fastening screws 22 are passed which are threaded into some rigid portion of the automobile, indicated by the numeral 23 in Fig. 7. The casing is therefore secured to the automobile in a vertical position, with the outer or front side thereof opening in a direction away from the side of the automobile.

Near the upper ends of the side walls, anchor pockets 24 are spot-welded or otherwise fastened in place, these pockets being stamped out of sheet metal or otherwise formed to provide a solid inner wall 25, each of which lies against the inner surface of a side wall of the casing, edge walls 26 disposed at a right angle to said inner wall, and retainer flanges 27 disposed parallel with the inner wall 25, the flanges 27 being spaced apart to provide a slot 28 in each of the anchor pockets which extends upwardly from a bottom wall 29 to the open top of the pocket.

The inner wall 18 of the casing is transversely slotted at its lower end, as at 30, 31, the slots being spaced apart and the metal of said wall between the lower slot 31 and the lower edge of the wall is bulged outwardly, as at 32. The metal of said wall above the slot 30 is also bulged outwardly, as at 33, while the metal between said slots is bulged inwardly, as at 34, thus providing a loop structure in said inner wall in which is retained a flexible tube 35 inserted from the bottom of the casing and retained in place under frictional contact with the outwardly and inwardly bulged portions of said wall.

Although not so shown in the drawings, it is the intention to have this flexible tube continued into the automobile to a point where the operating mechanism for the signal is located. This operating mechanism may be of any suitable construction, and will have connection with an operating wire 36 which extends upwardly through said flexible tube and is continued along the inner wall of the casing 16, for a purpose to appear hereinafter.

The signal arm is designated by the numeral 37, and it is constructed of tubing, preferably square in cross section. This signal arm therefore has an inner wall 38, an outer wall 39, and side walls 40 and 41, and it is arranged normally in vertical or depending position within the casing 16, preferably with the outer wall 39 somewhat in rear of the edges of the side walls 17 and 18 of the casing and with the inner wall 38 spaced from the inner wall of said casing. The side walls 40 and 41 of this signal arm are also spaced from the side walls 17 and 18 of said casing.

The side walls 40 and 41 of the signal arm are cut away at their lower ends, while the inner and outer walls thereof are bulged outwardly from a plane in line with the upper ends of said cut-away portions, and thence directed inwardly so that they contact at their lower ends, where they are soldered or otherwise suitably connected together so as to provide a spear or arrowhead-like lower or outer portion for the signal arm.

Placed over the openings thus provided in the signal arm, are correspondingly-shaped celluloid or other translucent colored plates or panels 42, which bear at their marginal portions against the edges of the inner and outer walls 38, 39, respectively, and these plates or panels are retained in position by channel-shaped members 43, which straddle the lower portion of the signal arm from the rear and front, and are made to conform to the spear or arrow-head-like extremity of said arm, said channel-shaped members 43, or substantially V-shaped plate as it may be termed, being secured in place by means of screws 44 passed therethrough and entered into the inner and outer walls 38, 39 of said signal arm.

The retainer plate 43 materially strengthens the outer end of the signal arm, and for the purpose of providing a rigid inner end for the tubular signal arm, a filler block 45 is inserted in the inner end of said arm, said filler block having a perforated lug 46 extending therefrom, which projects toward the inner wall 19 of the casing through a notch 47 formed in the inner wall of the signal arm. This filler block may be spot-welled or otherwise secured in place, but I preferably retain the same in place with a pin 48, which extends through said filler block and the side walls of the signal arm and projects with opposite ends from said side walls; said pin having oblong anchor plates 49 secured to its outer end so as to rotate thereon. Said securing pin may have opposite ends reduced in diameter to form stop shoulders 50, against which the inner surfaces of the anchor plates 49 bear, the ends of said pins being upset within said anchor plates, as best shown in Fig. 12.

The operating wire 36 extending upwardly along the inner wall of the casing is passed through the perforation in the lug 46 of the filler block and the extremity thereof wound around a portion of the wire adjacent its end so as to make a loop connection with said lug. Any other means of fastening the wire to the signal arm may, of course, be employed, but I consider the means illustrated and described exceedingly simple and effective.

Within the signal arm adjacent the translucent plates or panes 42, is a lamp socket 51 into which an electric lamp or bulb 52 is threaded which projects into the space between the translucent panes 42. Connected with the socket is a current-conducting wire 53, which extends upwardly or inwardly through the signal arm and enters a metallic tube 54 fitted in the filler block 45 and projecting both upwardly and downwardly from the latter. The downwardly projecting portion of this metallic tube is pressed against the circuit wire 53 by means of pliers or any other suitable tool so as to securely fasten the upper or inner extremity of said wire in said tube, and the upper projecting end of said tube is collapsed from opposite sides to bring opposite portions of its wall together, as at 55, Fig. 11, and thus form what may be termed a knife-edge contact.

The signal arm 37 is readily insertible into the casing, and also readily removable therefrom; it being simply necessary to thrust the arm into the casing through the open upper end of the latter, moving the arm downwardly parallel with the casing so as to position the anchor plates 49 in line with the anchor pockets 24, which anchor plates are inserted into the pockets until their lower ends strike the bottoms of the pockets. Thus positioned, the securing pin 48 of the signal arm is rotatable within the anchor plates and permits the signal arm to be swung from vertical into horizontal position or, if desired, into an intermediate position, depending on the provision made for operating the same. In some instances it may be desirable to indicate a stop or a right hand turn by positioning the signal arm at an oblique angle, whereas a left hand turn may be indicated by positioning said arm horizontally or at right angles to the casing as secured to the automobile.

It will be apparent therefore that when the driver of the automobile pulls upon the wire 36, the arm will be swung from the position shown in Fig. 5 to that shown in Fig. 6, or to any intermediate position, depending on the extent of pull given the operating wire.

To the outer surface of the rear wall 19 of the casing a fiber or other insulation plate 56 is secured. On this insulation plate is placed a metallic plate 57 which is secured in place by screw bolts, and nuts 58, the bolts passing through said insulation plate and being out of contact with the casing 16. The metallic plate 57 has portions cut away to enable the fiber or insulation plate 56 to be fastened to the casing by means of screw bolts and nuts 59. The fiber plate is provided with an opening 60 and a corresponding opening 61 is provided in the inner or rear wall of the casing, the metallic plate 57 being exposed through said openings from the interior of the casing.

Within the openings 60 and 61 the female members 62 of a knife switch are arranged, said members being adapted to receive between them the collapsed upper end of the metallic tube 54 serving as the male member of the knife switch, said female and male members serving as electrical contacts brought together upon swinging the signal arm into signaling position. The female members 62 of the knife switch are carried by the metallic plate 57 and are out of contact with all other parts of the device when the signaling arm is in normal position, or within a certain region approaching such position, and a current-conducting wire 63 is connected to one of the nuts utilized to secure the metallic plate 57 against the insulation plate 56. It may here be stated that the casing of the device is grounded, and by reason of the metallic connection between the electric lamp or bulb 52 and this casing, an electric circuit is established when the male contact 55 is engaged with the female contacts 62 of the knife switch, thus lighting the lamp or bulb so as to attract the attention of those in front and rear of the automobile to which the device is secured.

In order to close the top of the casing so as to guard against the elements of the weather entering from the top, a cover or tap 64 is provided. This comprises a top plate 65 lying in contact with the upper edges of the inner or rear wall 19 and the side walls 17 and 18 of the casing, a depending front wall 66 which fits in notches 67 formed in the side walls 17 and 18 of the casing at their upper ends, and depending lugs 68, which lie against the inner surfaces of the side walls 17 and 18 and are perforated and register with perforations 69 in said side walls, the perforations in the lugs being screw-threaded to receive screws 70 passed through the perforations 69 and entering the lugs 68 of the cap or cover.

The device described and illustrated is comparatively slender and neat in appearance. It is simple in construction and can be applied to automobiles of the enclosed or open type, or to trucks. The parts thereof can be easily assembled, and readily disassembled for repairs or replacements. For example, replacing the bulb, if burned out, requires merely the removal of the screws 44, withdrawal of the retainer plates 43, and the removal of one of the translucent panes 42 serving as light diffusing elements, the light area being readily accessible through the opening in one of the side walls of the signal arm thus uncovered.

Withdrawal of the securing pin 48 also permits of ready access to the interior of the signal arm for replacing the current-conducting wire 53, when found necessary.

Having thus described my invention, what I claim is:

1. A signal for automobiles, comprising a casing having spaced-apart pockets, a signal arm provided with anchor plates adapted to fit within said pockets so as to be wholly positioned within said casing, said anchor plates and signal arm being rotatably movable relative to each other to pivotally secure said signal arm within the casing.

2. An automobile signal, comprising an elongated casing having spaced-apart pockets, anchor plates removably positioned within said pockets, and a signal arm pivotally connected to said anchor plates.

3. An automobile signal, comprising a vertically elongated casing having two parallel walls spaced apart, anchor pockets secured to the inner sides of said spaced-apart walls and having their upper ends open, a signal arm insertable into said casing in the direction of the length thereof, and anchor plates pivotally mounted at opposite sides of said signal arm and removably inserted into said anchor pockets upon insertion of said signal arm into said casing.

4. An automobile signal, comprising a vertically elongated casing of substantially U-formation in cross section to provide an inner wall and opposite side walls, said casing being open at its outer side and at the top, a signal arm insertable into said casing from the top, and means carried by said signal arm for detachable connection with said side walls, said means having pivotal relation to said signal arm.

5. An automobile signal, comprising a casing and a signal arm pivotally secured within said casing, means for swinging said signal arm outwardly at an angle to said casing, said signal arm having a light chamber and openings for said light chamber in opposite walls thereof, light panes closing said openings, an angular retainer plate applied to the remaining walls of said signal arm and having flanges overlapping the marginal portion of said light panes, and means for securing said retainer plate to said remaining walls.

6. An automobile signal having a signal element formed of tubular material and having opposite walls cut away to provide openings, the remaining walls adjacent said openings being bulged outwardly medially of said openings and inclined toward the end of the signal arm to meet at said end, light panes bearing marginally against the edges of the so fashioned wall portions, a channel-shaped retainer plate applied to said so fashioned wall portions, the flanges of said retainer plate overlapping the marginal portions of said light panes, and means for securing said retainer plate to said signal arm.

7. An automobile signal, comprising a vertically elongated casing of substantially U-formation in cross section to provide an inner wall and opposite side walls, said inner wall having opposed securing lugs stamped therefrom and projecting outwardly beyond the same for attachment of the casing to an automobile, and a signal arm pivotally secured within said casing.

8. An automobile signal, comprising an elongated casing, a signal arm pivoted at one end within said casing, one wall of said casing having spaced-apart superposed slots and the metal between said slots bulged in one direction while the metal above the upper slot and beneath the lower slot is bulged in an opposite direction, a flexible tube inserted between the bulged portions of said wall and being frictionally retained therein, and an operating wire extending through said flexible tube and into said casing, said wire having connection with said signal arm for swinging the latter in an arc of a circle.

9. An automobile signal, comprising a vertically elongated casing of substantially U-formation in cross section, anchor pockets secured interiorly to opposite walls of said casing, said anchor pockets being closed at their lower ends and open at their upper ends, a signal arm, anchor plates at opposite sides of said signal arm held in spaced relation thereto, said anchor plates being inserted into said anchor pockets through their upper open ends and bearing against the closed bottoms of said pockets, said anchor plates being insertable into said anchor pockets and removable therefrom by movement of said signal arm in the direction of length of said casing, said signal arm and anchor plates being movable relatively, and means for swinging said signal arm in an arc of a circle.

10. An automobile signal, comprising a vertically elongated casing of substantially U-formation in cross section, a signal arm within said casing, anchor elements at opposite sides of said signal arm, means on the inner sides of opposite walls of said casing immovably holding said anchor elements, and pivotal connection between said signal arm and said anchor elements.

11. An automobile signal, comprising a vertically elongated casing having interior anchor pockets spaced apart, a signal arm positioned within said casing between said pockets, anchor elements carried by said signal arm and removably positioned within said pockets, and a pivot pin extending through said signal arm and into said anchor elements, said pivot pin serving as a means of connecting the anchor elements to said signal arm and as a means to permit said signal arm to be swung in an arc of a circle.

12. An automobile signal, comprising a vertically elongated casing of substantially U-formation in cross section, said casing being open at its upper end, anchor pockets secured to the inner sides of opposite side walls of said casing, said anchor pockets being closed at the bottom and open at the top, an elongated signal arm normally in depending position within said casing and having anchor plates pivotally secured thereto positioned in spaced relation to opposite sides of said signal arm, said anchor plates being insertible into said anchor pockets through the open upper end of said casing, and a cap closing the upper end of said casing to prevent the elements of the weather entering the casing from the top.

CHARLES J. MILLER.